United States Patent [19]

Wasley

[11] 3,920,839
[45] Nov. 18, 1975

[54] ADAMANTYLCARBOXAMIDO-PHENYLALKANOIC ACIDS AND ESTERS THEREOF FOR TREATING INFLAMMATORY DISORDERS AND ALLERGIES

[75] Inventor: Jan W. F. Wasley, Mount Kisco, N.Y.

[73] Assignee: Ciba-Geigy Corporation, Ardsley, N.Y.

[22] Filed: Apr. 12, 1974

[21] Appl. No.: 460,406

Related U.S. Application Data

[63] Continuation-in-part of Ser. No. 311,054, Dec. 1, 1972, Pat. No. 3,839,433, which is a continuation-in-part of Ser. No. 157,770, June 28, 1971, abandoned, which is a continuation-in-part of Ser. No. 22,406, March 24, 1970, abandoned, which is a continuation-in-part of Ser. No. 810,828, March 26, 1969, abandoned.

[52] U.S. Cl.................................. 424/319; 424/309
[51] Int. Cl..................... A61k 31/195; A61k 31/24
[58] Field of Search............ 424/317, 319, 308, 309

[56] References Cited
UNITED STATES PATENTS 3,766,262  10/1973  Szinai et al...................... 260/518 R

*Primary Examiner*—Stanley J. Friedman
*Attorney, Agent, or Firm*—Joseph G. Kolodny; Theodore O. Groeger; John J. Maitner

[57] ABSTRACT

Pharmaceutical compositions comprising an effective amount of adamantylcarboxamidophenylalkanoic acids, their esters or salts, and a pharmaceutical excipient, are anti-allergic and anti-inflammatory agents.

10 Claims, No Drawings

ADAMANTYLCARBOXAMIDOPHENYLALKANOIC ACIDS AND ESTERS THEREOF FOR TREATING INFLAMMATORY DISORDERS AND ALLERGIES

CROSS-REFERECES TO RELATED APPLICATIONS

This is a continuation-in-part of Ser. No. 311,054, filed Dec. 1, 1972, (now U.S. Pat. No. 3,839,433) which in turn is a continuation-in-part of application Ser. No. 157,770, filed June 28, 1971, which in turn is a continuation-in-part of application Ser. No. 22,406, filed Mar. 24, 1970, which in turn is a continuation-in-part of application Ser. No. 810,828, filed Mar. 26, 1969 (the latter three are abandoned).

SUMMARY OF THE INVENTION

The present invention pertains to pharmaceutical compositions comprising an effective amount of compounds of Formula I

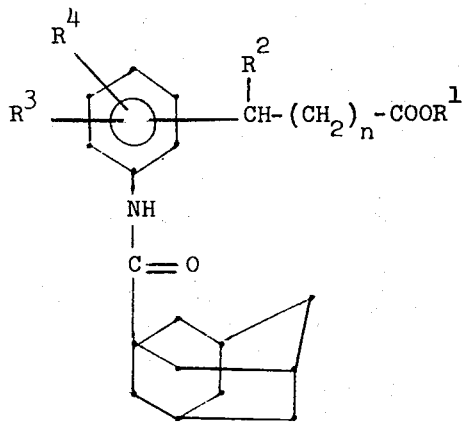

(I)

wherein
$R^1$ and $R^2$ are hydrogen or lower alkyl;
$R^3$ and $R^4$ are hydrogen, fluoro, chloro, bromo, lower alkyl, lower alkoxy, or trifluoromethyl; and
$n$ is 0 or 1 or pharmaceutically acceptable non-toxic salts of those compounds wherein $R^1$ is hydrogen, and a pharmaceutical excipient; as well as to novel methods utilizing said compositions for the treatment of allergic and inflammatory conditions.

DESCRIPTION OF THE PREFERRED EMBODIMENTS

The term "lower alkyl" as used herein alone or in combination, such as in "lower alkoxy", means a straight or branched hydrocarbon chain of the formula $C_mH_{2m+1}$ wherein $m$ represents an integer of from 1 to 4. Illustrative of such alkyl groups are methyl, ethyl, propyl, isopropyl, n-, iso- or t-butyl; $m=1$ or 2 is preferred. Illustrative of lower alkoxy groups is methoxy, ethoxy, n- or iso-propoxy or -butoxy, and the like, preferably methoxy. The preferred alkyl groups for substituent $R^2$ are methyl and ethyl.

The term "pharmaceutically acceptable non-toxic salts" means salts formed with inorganic or organic bases which themselves have no undersirable physiological action in the usual dosages. Suitable salts are sodium, potassium, magnesium, calcium and ammonium salts and also salts with ethylamine, triethylamine, ethanolamine, diethanolamine, ethylenediamine, pyrrolidine, etc.

The unsubstituted and substituted adamantylcarboxamidophenylalkanoic acids and lower alkyl esters can be prepared by reacting aminophenyl alkanoic acids and lower alkyl esters with adamantoyl chloride or bromide in an anhydrous solvent, for instance, a mixture of benzene and an organic base, like pyridine. The preferred solvent is pyridine. The acids or esters can be prepared from one another by subsequent hydrolysis of the esters, for instance, by means of sodium hydroxide or potassium hydroxide or by esterification of the acids, for instance, by means of an esterifying agent, for example, diazomethane or an alcohol with an acid catalyst. These reactions can be represented as follows:

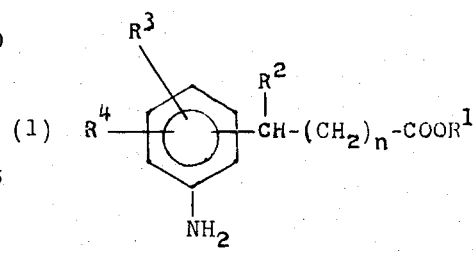

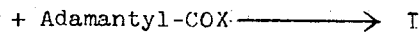

2. Ia($R^1$=lower alkyl) $\xrightarrow{hydrolysis}$ Ib($R^1$=H)
3. Ib($R^1$=hydrogen) $\xrightarrow{esterification}$ Ia($R^1$=lower alkyl)

wherein
$R^1$, $R^2$, $R^3$, $R^4$ and $n$ have the meaning as defined in formula I and
X is chlorine or bromine.

The aminophenylalkanoic acids and lower alkyl esters are prepared by the reductiion of the corresponding nitro compounds, which may be prepared from known chemicals by known procedures.

The compounds of the present invention demonstrate the properties of inhibiting and reducing inflammation, and of suppressing immune responses in warm-blooded animals when administered orally or parenterally, and are thus useful as anti-inflammatory agents. Although the mechanism of action of these anti-inflammatory agents is not completely understood it may at least in part be traceable to the compounds' ability to suppress antibody formation. Thus while the compounds can be shown to demonstrate activity in classical laboratory models for testing anti-inflammatory properties such as the anti-carrageenin test, serum turbidity test, adjuvant arthritis test, and antipyretic test, they also demonstrate immuno-suppressive activity in the Jerne Hemolytic Plaque Technique.

In addition to the above properties, the compounds of the present invention advantageously exhibit anti-allergic effects. These can be demonstrated in animal tests, using advantageously mammals, such as rats, guinea pigs, dogs or monkeys. Compounds of the invention can be administered to the animals either enterally, preferably orally, or parenterally, e.g. subcutaneously, intravenously, for example, in the form of aqueous solutions, suspensions or by means of an aerosol. The applied dosage ranges between about 1 and 300 mg/kg/day, preferably between about 20 and 200/mg/kg/day, or more preferably between 40 and 100 mg/kg/day. The tests chosen are the guinea pig anaphylaxis, canine asthma and primate skin allergy. In each system, various standards are tested for reference purposes.

Thus, for example, the 2-(1-adamantylcarboxamido)phenylacetic acid, a representative member of the compounds of formula 1, in the canine asthma model after the induction of an asthmatic attack (therapeutic) showed 70 percent inhibition at 100 mg/kg/po. When administered i.v. at 40 mg/kg, said compound gave 40 percent inhibition. The former effect is equivalent to that observed by theophylline. Finally, when mixed with the inducing antigen (inhalant) at 3 mg/kg, the compound inhibited the reaction 66 percent. In the monkey skin allergy model, the above compound gives a dose-related inhibition of the reaction, whereas antihistamines are inactive. In the guinea pig anaphylaxis model, pretreatment with the above compound inhibits the reactions 69 percent at 100 mg/kg/po. It is also noted that said compound, given after anaphylaxis has occurred, inhibits, 1 hour later (at the time of peak blood levels), the residual bronchoconstriction which clinically results in delayed deaths [Collier, H.O.J., et al., Brit. J. Pharmacol. Chemotherap. 30, 283 (1967)]. Anti-histamines do not inhibit this residual broncho-constriction indicating that the above compound is capable of inhibiting mediators of this reaction which are insensitive to antihistamines. Accordingly, compounds of the invention are anti-allergic agents and are useful, for example, in the treatment or management of asthma.

The preferred compounds are those defined in formula I wherein $R^1$, $R^2$, and $R^4$ are hydrogen, $R^3$ is hydrogen, fluoro, chloro, bromo, lower alkyl, lower alkoxy, or trifluoromethyl, $n$ is 0, and the alkanoic acid is in the ortho-position of the phenyl ring relative to the adamantylcarboxamido group. The following compounds are illustrative:

2-(1-adamantylcarboxamido)-4-methylphenylacetic acid, 2-(1-adamantylcarboxamido)-4-trifluoromethylphenylacetic acid, 2-(1-adamantylcarboxamido)-5-fluorophenylacetic acid, 2-(1-adamantylcarboxamido)-5-methoxyphenylacetic acid, and, above all, the 2-(1-adamantylcarboxamido)phenylacetic acid.

In actual use, the compounds of formula I are administered to mammals for the purpose of treating various inflammatory conditions which are commonly treated with known anti-inflammatory agents, particularly those in which an immunological mechanism is believed to be present, such as various forms of rheumatoid arthritis. The compounds are also administered to mammals for the purpose of treating various allergic conditions, particularly of the asthmatic type. The new compounds are incorporated in compositions suitable for oral administration to mammals in solid and liquid unit dosage forms, such as tablets, capsules, powders, granules, syrups, elixirs, and the like. The term unit dosage form as used in this specification and claims refers to physically discrete units suitable as unitary dosage for mammals, each unit containing a predetermined quantity of active material calculated to produce the desired therapeutic effect in association with the required pharmaceutical diluent carrier or vehicle. The compositions thus contain about 0.1–75 percent, preferably about 1–50 percent, of the active ingredient.

Powders are prepared by comminuting a compound of this invention to a suitably fine size and mixing a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and water-soluble diluent such as sucrose, glucose, and the like is wetted with a binder such as acacia mucilage, gelatin solution, methylcellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitable comminuted, with a diluent or base such as starch, sucrose, kaolin, dicalcium phosphate and the like. The powder mixture can be granulated by wetting with a binder such a syrup, starch paste or acacia mucilage and forcing through a screen. As an alternative to granulating, the powder mixture can be slugged, i.e. run through the tablet machine and the resulting imperfectly formed tablets broken into slugs. The slugs can be lubricated to prevent sticking to the tablet forming dies by means of the addition of stearic acid, a stearate salt, talc or mineral oil. The lubricating mixture is them compressed into tablets. A protective coating consisting of a sealing coat of shellac, a coating of sugar and methylcellulose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a non-toxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration. Particularly suitable for parenteral administration are the addition salts of the compounds of formula I.

The amount of these compounds which is administered must in all cases be adjusted to the mammal being treated, its age, weight and condition, as well as the degree of response required. The actual dose should be carefully titrated to the particular subject in accordance with well-recognized principles of pharmacology.

The following examples are given by way of illustrating the process for the preparation of the compounds and the compositions without limiting the scope thereof an any way. The temperatures are given in degrees Centigrade.

EXAMPLE 1

Methyl 2-(1-adamantylcarboxamido)phenylacetate

Twenty grams of methyl 2-aminophenylacetate are dissolved in 150 ml of dry pyridine and cooled to 0°. 28 g of 1-adamantanecarbonyl chloride is added slowly with vigorous stirring. On completion of the addition, the reaction is stirred at room temperature for 3 hours, the pyridine hydrochloride formed during the reaction is then separated by filtration. After the addition of water to the filtrate the desired product precipitates. The precipitate is separated by filtration and is recrystallized from aqueous ethanol as colorless prisms melting at 130°–131°C.

EXAMPLE 2

2-(1-Adamantylcarboxamido)phenylacetic acid

A mixture of 23.3 g of methyl 2-(1-adamantylcarboxamido)phenylacetate and 100 ml of N sodium hydroxide is heated under reflux until a homogeneous solution is obtained. The solution is filtered, cooled to room temperature and the pH adjusted to 3 with 6N hydrochloric acid. A sticky white solid precipitates which is dissolved in hot ethanol. Sufficient water is then added to induce crystallization. The desired product is recrystallized from aqueous ethanol as colorless needles melting at 230°–231°C.

EXAMPLE 3

2-(1-Adamantylcarboxamido)-4-methylphenylacetic acid a. Twenty-three grams of sodium metal spheres are added with stirring at a moderate rate to 1 liter of absolute ethanol contained in a 5 liter three-necked flask equipped with stirrer, condenser and dropping funnel. Diethyl malonate (160.2 g) is then added dropwise by means of the dropping funnel, followed by the addition of 171.6 g of 3-nitro-4-chlorotoluene. The mixture is heated at reflux for 2.5 hours after which the ethanol is distilled off at atmospheric pressure. To the reaction flask is then added 1 liter of absolute ethanol and 1 liter of 10% potassium hydroxide and the mixture is then heated at reflux for 1.5 hours, followed by distillation of the ethanol at atmospheric pressure. The solution is cooled to room temperature and extracted twice with 500 ml of ether. The basic aqueous layer is adjusted to a pH of 1 by means of 6N hydrochloric acid to yield a brown solid. The product is collected by filtration and dried for 18 hours at 70°C/10 mm. The 4-methyl-2-nitrophenylacetic acid melts at 167°–8°C.

b. A mixture of 17.5 g of 4-methyl-2-nitrophenylacetic acid, 250 ml of absolute methanol and 5 ml of concentrated sulfuric acid is heated at reflux for 2 hours, then excess solvent is removed by distillation. The reaction is cooled to room temperature, rendered basic with a 10% ammonium hydroxide solution, diluted with 500 ml of water and twice extracted with 300 ml of ether. The ether extracts are dried over magnesium sulfate, clarified, filtered, and evaporated to dryness under reduced pressure to yield methyl 4-methyl-2-nitrophenylacetate as an amber-colored oil.

c. The oil obtained according to part b) of this Example is dissolved in 150 ml of ethyl acetate and 1 g of 5% palladium on carbon as added as catalyst. The reaction mixture is hydrogenated at atmospheric pressure until three molar equivalents of hydrogen are consumed. The catalyst is removed by filtration and the filtrate is evaporated to dryness under reduced pressure at 30°–35°C, yielding methyl 2-amino-4-methylphenylacetate as an oil.

d. To a stirred solution of 7.5 g of methyl 2-amino-4-methylphenylacetate in 150 ml of dry pyridine is added 8.4 g of 1-adamantanecarbonyl chloride in one portion, maintaining a reaction temperature of from 25° to 30°C. The mixture is stirred for 15 minutes during which time pyridinium chloride separates out. The mixture is diluted with 200 ml of water and the precipitate is collected by filtration to yield methyl 2-(1-adamantylcarboxamido)-4-methylphenylacetate, m.p. 144°–5°C.

e. A mixture of 12.1 g of a compound according to part d) of this Example and 150 ml of 0.5N sodium hydroxide solution is heated under reflux until a homogeneous solution is obtained. The solution is cooled to 20°C, filtered and adjusted to a pH of 4 with 3N hydrochloric acid. The solid is collected by filtration and is recrystallized from aqueous ethanol as colorless plates, m.p. 214°–215°C.

EXAMPLE 4

2-(1-Adamantylcarboxamido)-4-trifluoromethylphenylacetic acid a. To a mixture of 17.7 g of methyl 2-amino-4-trifluoromethylphenylacetate in 200 ml of dry pyridine are added 15.1 g of 1-adamantanecarbonyl chloride in one portion. The mixture is kept at 20°C and is agitated for 5 minutes at which time pyridinium chloride separates. The reaction mixture is diluted with 400 ml of water. With further agitation, the product precipitates. The solid is collected by filtration, washed twice with 50 ml of water and dried in vacuo. The obtained methyl 2-(1-adamantylcarboxamido)-4-trifluoromethylphenylacetate melts at 120°–122°C.

b. A mixture of 30 g of methyl 2-(1-adamantylcarboxamido)-4-trifluoromethylphenylacetate and 200 ml of 0.5N sodium hydroxide solution is heated under reflux until a homogeneous solution is obtained. The solution is clarified, filtered and cooled to room temperature. The pH of the filtrate is adjusted to pH 4 with 3N hydrochloric acid, and the solid is collected by filtration. The product is recrystallized from aqueous ethanol as colorless plates, m.p. 218°–219°C.

EXAMPLE 5

2-(1-Adamantylcarboxamido)-5-fluorophenylacetic acid a. A mixture of 10 g of 5-fluoro-2-nitrophenylacetonitrile and 75 ml of concentrated hydrochloric acid is heated at reflux for 90 minutes. The reaction mixture is poured into 300 ml of cold water with stirring whereupon the 5-fluoro-2-nitrophenylacetic acid precipitates. The solid is collected by filtration and is dried in vacuo, m.p. 151°–5°C.

b. A mixture of 8.1 g of 5-fluoro-2-nitrophenylacetic acid, 150 ml of absolute methanol and 5 ml of concentrated sulfuric acid is heated at reflux for 2 hours. Excess methanol is evaporated, the residue is diluted with 200 ml of water, and the solution is rendered basic with a 10% ammonium hydroxide solution. The basic aqueous layer is extracted twice with 200 ml of ether. The ethereal extracts are clarified, dried over magnesium sulfate, and the solvent evaporated under reduced pressure to yield methyl 5-fluoro-2-nitrophenylacetate as an oil.

c. To 7.7 g of methyl 5-fluoro-2-nitrophenylacetate, dissolved in 200 ml of absolute ethanol, are added 1 g of 5% palladium on barium sulfate. The mixture is hydrogenated at atmospheric pressure and at 20°C until three molar equivalents of hydrogen are consumed. The catalyst is removed by filtration and the filtrate is evaporated to dryness under reduced pressure to yield methyl 5-fluoro-2-aminophenylacetate as an oil.

d. A mixture is prepared by dissolving 6.4 g of methyl 5-fluoro-2-aminophenylacetate in 150 ml of dry pyridine. 7.2 g of 1-adamantanecarbonyl chloride are added to the stirring pyridine solution in one portion. The mixture is stirred vigorously for 3 to 5 minutes and is then diluted with 400 ml of water precipitating a solid which is methyl 2-(1-adamantylcarboxamido)-5-fluorophenylacetate. The product is collected by filtration, washed with water and dried, m.p. 140°–142°C.

e. A mixture of 11.1 g of methyl 2(1-adamantylcarboxamido)-5-fluorophenylacetate and 200 ml of 0.5N sodium hydroxide is heated at refluxing temperature until a homogeneous solution is obtained. The solution is clarified, filtered, diluted with 250 ml of water, cooled to room temperature and rendered acid to a pH of 4 with 6N hydrochloric acid. The product is collected by filtration and is recrystallized from aqueous ethanol as colorless needles, m.p. 247°–248°C.

EXAMPLE 6

2-(1-Adamantylcarboxamido)-5-methoxyphenylacetic acid a. 5-methoxy-2-nitrophenylacetic acid is prepared according to the procedure described by C. F. Koelsch, J. Am. Chem. Soc. 66, 2019–20 (1944).

b. After dissolving 33 g of 5-methoxy-2-nitrophenylacetic acid in 200 ml of absolute methanol, 5 ml of concentrated sulfuric acid are added. The mixture is heated at reflux for 2 hours. Excess solvent is removed by distillation, the residue is diluted with 550 ml of water, and the solution is rendered basic with 10% ammonium hydroxide. The aqueous solution is extracted with ether (3 × 300 ml). The ethereal extracts are clarified, dried over magnesium sulfate, and the solvent evaporated under reduced pressure to yield a solid which is methyl 5-methoxy-2-nitrophenylacetate, m.p. 162°–164°C.

c. 34.1 g of Methyl 5-methoxy-2-nitrophenylacetate is dissolved in 200 ml of ethyl acetate and 3 g of 5% palladium on barium sulfate is added as catalyst. The mixture is hydrogenated at atmospheric pressure at 20°C, until three molar equivalents of hydrogen have been consumed. The catalyst is separated by filtration and the filtrate is evaporated to dryness under reduced pressure to yield methyl 5-methoxy-2-aminophenylacetate as an oil.

d. To a mixture of 9.7 g of methyl 5-methoxy-2-aminophenylacetate in 80 ml of dry pyridine are added 9.9 g of 1-adamantanecarbonyl chloride while stirring. After a few minutes, pyridinium chloride precipitates. The mixture is allowed to stir at room temperature for 10 minutes; then the mixture is diluted with 300 ml of water whereupon methyl 2-(1-adamantylcarboxamido)-5-methoxy-phenylacetate precipitates. The solid is collected by filtration and is washed twice with 100 ml of water. The crude product melts at 163°–165°C.

e. A mixture of 22 g of methyl 2-(1-adamantylcarboxamido)-5-methoxyphenylacetate and 150 ml of 0.5N sodium hydroxide is heated at reflux until a homogeneous solution is obtained. The solution is clarified, filtered, diluted with 200 ml of water, cooled to room temperature and rendered acid with 3N hydrochloric acid to a pH of 4. The solid is collected by filtration, washed with water and recrystallized from aqueous ethanol, m.p. 188°–189°C.

EXAMPLE 7

2-(1-Adamantylcarboxamido)-4,5-dimethoxyphenylacetic acid a. The starting material methyl 2-amino-4,5-dimethoxyphenylacetate is prepared according to the procedure described by G. N. Walker, J. Am. Chem. Soc. 77, 3844–50 (1955).

b. To a stirring mixture of 21.8 g of methyl 2-amino-4,5-dimethoxyphenylacetate in 150 ml of dry pyridine are added 19.2 g of 1-adamantanecarbonyl chloride while maintaining the reaction temperature at 30°C by means of an ice-water bath. The reaction mixture is agitated for 10 minutes at room temperature at which time it is diluted with 400 ml of water upon which a viscous oil separates. The aqueous layer is decanted and the residual oil is solidified upon trituration with 150 ml of ether and scratching. The product is collected by filtration and is recrystallized from aqueous ethanol to yield methyl 2-(1-adamantylcarboxamido)-4,5-dimethoxyphenylacetate melting at 149°–150°C.

c. A mixture of 16.5 g of methyl 2-(1-adamantylcarboxamido)-4,5-dimethoxyphenylacetate and 200 ml of 0.5 N sodium hydroxide solution is heated at reflux until a homogeneous solution is obtained. The hot solution is clarified, filtered and cooled to room temperature. The solution is then adjusted to pH 4 with 3N hydrochloric acid whereupon a solid precipitates. The solid is collected by filtration and is recrystallized from aqueous ethanol, m.p. 230°–232°C.

EXAMPLE 8

2-[2-(1-Adamantylcarboxamido)phenyl]propionic acid a. To a solution of 10.2 g of methyl α-methyl-o-nitrophenylacetate in 150 ml of ethyl acetate, there is added 1.5 g of 5% palladium on barium sulfate as catalyst. The mixture is hydrogenated at atmospheric pressure and room temperature until three molar equivalents of hydrogen are consumed. The catalyst is removed by filtration and the solvent is evaporated to dryness under reduced pressure at 30°C. Methyl α-methyl-o-aminophenylacetate in form of an amber oil is obtained.

b. A solution of 8.3 g of methyl α-methyl-o-aminophenylacetate in 150 ml of pyridine is cooled and stirred while 9.14 g of 1-adamantanecarbonyl chloride are added. After 5 hours a small quantity of water is added, the mixture is left to stir at room temperature for 18 hours, is diluted with 200 ml of water and is rendered basic with a 5% sodium bicarbonate solution. The reaction product is extracted with ether. The ethereal extracts are dried and the solvent evaporated to dryness to yield methyl 2-[2-(1-adamantylcarboxamido)phenyl]propionate, m.p. 97°–99°C.

c. The methyl 2-[2-(1-adamantylcarboxamido)phenyl]propionate obtained according to part b) of this Example is mixed with 0.1 N sodium hydroxide and the mixture heated at reflux until a homogeneous solution is obtained. The solution is clarified, filtered, cooled, and the pH adjusted to 1. The desired product precipitates. The solid is collected by filtration and is recrystallized from aqueous ethanol, m.p. 190°–192°C.

EXAMPLE 9

Methyl 2-[2-(1-adamantylcarboxamido)-4-trifluoromethylphenyl]propionate a. To an ice-bath cooled solution of 40.0 g of methyl 2-nitro-4-trifluoromethylphenylacetate in 250 ml of dimethylformamide, there is added 6.4 g of 57 percent oil dispersion of sodium hydride followed by the addition of 107.9 g of methyl iodide. The mixture is heated at 40°C until the color of the solution changed to a deep yellow. The solution is poured into ice-water, extracted into ether and the ethereal solution is washed with water, dried, clarified and filtered. The solvent is evaporated to dryness under reduced pressure. Methyl 2-(2-nitro-4-trifluoromethylphenyl)propionate in form of a yellow oil is obtained.

b. To a solution of 42.5 g of methyl 2-(2-nitro-4-trifluoromethylphenyl)propionate in 300 ml of ethyl acetate, there is added 5.2 g of 5% palladium on barium sulfate as catalyst. The mixture is hydrogenated at atmospheric pressure and room temperature until three molar equivalents of hydrogen are consumed. The catalyst is removed by filtration and the solvent is evaporated to dryness under reduced pressure at 30°C. Methyl 2-(2-amino-4-trifluoromethylphenyl)propionate in form of a pale yellow oil is obtained.

c. To a stirred solution of 16.6 g of methyl 2-(2-amino-4-trifluoromethylphenyl)propionate in 100 ml of dry pyridine is added 13.9 g of 1-adamantanecarbonyl chloride in one portion, maintaining a reaction temperature of 30°–40°C. The mixture is stirred for 1 hour during which time pyridinium chloride separates out. The mixture is diluted with 400 ml of water and the precipitate is collected by filtration. The solid is recrystallized from aqueous ethanol to yield methyl 2-[2-(1-adamantylcarboxamido)-4-trifluoromethylphenyl]propionate as colorless plates, m.p. 121–122°C.

EXAMPLE 10

2-[2-(1-Adamantylcarboxamido)-4-trifluoromethylphenyl]propionic acid

A mixture of 19.2 g of methyl 2-[2-(1-adamantylcarboxamido)-4-trifluromethylphenyl]propionate and 400 ml of 0.45N sodium hydroxide solution is heated under reflux until a homogeneous solution is obtained. The solution is cooled and extracted twice with 250 ml of ether. The aqueous layer is then rendered acid to pH 1 with 6N hydrochloric acid and the precipitate collected by filtration. The solid is recrystallized from aqueous ethanol to yield 2-[2-(1-adamantylcarboxamido)-4-trifluoromethylphenyl]propionic acid melting at 215°–216°C.

EXAMPLE 11

Methyl 2-[2-(1-Adamantylcarboxamido)-4-trifluoromethylphenyl]hexanoate a. To an ice-bath cooled solution of 27.5 g of methyl 2-nitro-4-trifluoromethylphenylacetate in 200 ml of dimethylformamide, there is added 4.4 g of 57% oil dispersion of sodium hydride followed by the addition of 28.5 g of n-bromobutane. The mixture is heated at 120°C until the color of the solution changed to a deep yellow. The solution is poured into ice-water, extracted into ether and the ethereal solution is washed with water, clarified, dried and filtered. The solvent is evaporated to dryness under reduced pressure at 30°C. Methyl 2-(2-nitro-4-trifluoromethylphenyl)hexanoate in form of an amber oil is obtained. The amber oil is distilled under reduced pressure (0.005 mm) and at 100°–103°C to yield 19.5 g of a yellow oil.

b. To a solution of 19.5 g of methyl 2-(2-nitro-4-trifluoromethylphenyl)hexanoate in 250 ml of ethylacetate, there is added 3.5 g of 5% palladium on barium sulfate as catalyst. The mixture is hydrogenated at atmospheric pressure and room temperature until three molar equivalents of hydrogen are consumed. The catalyst is removed by filtration and the solvent is evaporated to dryness under reduced pressure at 30°C. Methyl 2-(2-amino-4-trifluoromethylphenyl)hexanoate in form of a pale yellow oil is obtained.

c. To a stirred solution of 17.6 g of methyl 2-(2-amino-4-trifluoromethylphenyl)hexanoate in 50 ml of dry pyridine is added 12.3 g of 1-adamantanecarbonyl chloride in one portion, maintaining a reaction temperature of from 30°–45°C. The mixture is stirred for 1 hour during which time pyridium chloride separates out. The mixture is diluted with 400 ml of water and the precipitate is collected by filtration. The solid is recrystallized from aqueous ethanol to yield methyl 2-[2-(1-adamantylcarboxamido)-4-trifluoromethylphenyl]hexanoate as colorless crystals, m.p. 172°–128°C.

EXAMPLE 12

2-[2-(1-Adamantylcarboxamido)-4-trifluoromethylphenyl]hexanoic acid

A mixture of 18.7 g of methyl 2-[2-(1-adamantylcarboxamido)-4-trifluoromethylphenyl]hexanoate, 32.8 g of sodium bicarbonate, 300 ml of methanol and 20 ml of water is heated at 80°C for 18 hours. The solution is evaporated to dryness under reduced pressure and is diluted with 400 ml of water. The solution is extracted twice with 250 ml of ether and the aqueous layer is rendered acid to pH 1 with 6N hydrochloric acid. The aqueous layer is extracted with ether and the ethereal solution is washed with water, charcoaled, dried and filtered. The solvent is evaporated to dryness and the solid obtained recrystallized from ether-petroleum ether (b.p. 30°–40°C) to yield 2-[2-(1-adamantylcarboxamido)-4-trifluoromethylphenyl]hexanoic acid melting at 170°–171.5°C.

EXAMPLE 13

Sodium 2-(1-adamantylcarboxamido)phenylacetate 7.8 g of the compound of Example 2 was dissolved in ca. 200 ml of methanol and 1.34 g of sodium methoxide was added to the solution. The solvent was then removed by evaporation under reduced pressure to yield a white foam. The product was crystallized twice by suspending the solid in hot acetone (100 ml) and adding methanol (ca. 20 ml) to effect solution. The product crystallized overnight at room temperature, m.p. 237°–240°C.

EXAMPLE 14

2-(1-Adamantylcarboxamido)phenylacetic acid

A 2-aminophenylacetic acid (3.02 g) is dissolved in dry pyridine (50 ml and cooled to 0°, and 1-adamantane carbonyl chloride (3.97 g) is added slowly with vigorous stirring. On completion of the addition, the reaction is stirred at room temperature for 1 hour, the pyridine hydrochloride formed during the reaction is then separated by filtration. After the addition of water (250 ml) to the filtrate the desired product is extracted into chloroform (250 ml). The chloroform extract is washed with water (750 ml; 3 × 250 ml) and dried over magnesium sulfate and the solvent is evaporated under reduced pressure. The product is purified by partitioning the crude material between the sodium bicarbonate solution and ether. The aqueous solution is separated and acidified with 6N hydrochloric acid, whereby the product precipitates as a sticky white solid, which is collected by filtration. The desired product is recrystallized from aqueous ethanol as colorless needles melting at 230°–231°C.

EXAMPLE 15

3-(1-Adamantylcarboxamido)phenylacetic acid a. A mixture is prepared from 10 g of methyl 3-aminophenylacetate and 150 ml of dry pyridine, and 10.2 g of 1-adamantanecarbonyl chloride are added in one portion to the stirring solution. The reaction is stirred for 10 minutes at which time it is diluted with 300 ml of water precipitating methyl 3-(1-adamantylcarboxamido)phenylacetate as a white solid. The product is collected by filtration, washed with water (3 × 100 ml) and dried in vacuo, m.p. 132°–133°C.

b. A mixture of 16.4 g of methyl 3-(1-adamantylcarboxamido)phenylacetate and 200 ml of 0.5N sodium hydroxide solution is heated at reflux until a homogeneous solution is obtained. The solution is filtered, the filtrate diluted with 400 ml of water and the pH adjusted to 4 with 6N hydrochloric acid whereupon the desired product precipitates. The product is collected by filtration, washed with water (3 × 100 ml) and recrystallized from aqueous ethanol, m.p. 203°–204°C.

EXAMPLE 16

4-(1-Adamantylcarboxamido)phenylacetic acid a. To a mixture of 16.5 g of methyl 4-aminophenylacetate in 100 ml of dry pyridine are added 19.5 g of 1-adamantanecarbonyl chloride while maintaining the reaction temperature between 25°–30°C. On completion of addition, pyridinium chloride separates out and the reaction mixture is stirred for further 15 minutes at room temperature after which time it is diluted with 200 ml of water yielding methyl 4-(1-adamantylcarboxamido)phenylacetate as a copious precipitate. The solid is collected by filtration and dried, m.p. 155°–156°C.

b. A mixture of 18 g of methyl 4-(1-adamantylcarboxamido)phenylacetate and 200 ml of 0.5N sodium hydroxide is heated at reflux until a homogeneous solution is obtained. The solution is cooled to 35°C and the sodium salt separates out. The solid is collected by filtration and is dried in vacuo. The sodium salt is recrystallized from water, m.p. 294°–295°C. The salt is then dissolved in 250 ml of water and the solution is adjusted to pH 4 by means of 3N hydrochloric acid. The formed acid is collected by filtration and recrystallized from aqueous ethanol to yield the desired product in form of colorless plates, m.p. 193°–194°C.

EXAMPLE 17

3-[2-(1-Adamantylcarboxamido)phenyl]propionic acid a. A solution of 23.4 g of methyl-o-aminocinnamate in 200 ml of pyridine is stirred while 26.2 g of 1-adamantanecarbonyl chloride are added. The reaction mixture is stirred at room temperature for 15–20 minutes and is then diluted with 500 ml of water yielding a precipitate. The suspension is left stirring overnight at room temperature. The solid is collected by filtration and is recrystallized from aqueous ethanol. The recrystallized material is collected by filtration and is washed with cold ether to yield methyl 2-(1-adamantylcarboxamido)cinnamate as an off-white colored solid, m.p. 170°–172°C.

To a solution of 8.5 g of methyl 2-(1-adamantylcarboxamido)cinnamate in 200 ml of absolute ethanol and 5 ml of glacial acetic acid, there is added 1.5 g of 5% palladium on barium as catalyst. The mixture is hydrogenated at atmospheric pressure and room temperature until one molar equivalent of hydrogen is consumed. The catalyst is removed by filtration and the filtrate is evaporated to dryness to yield methyl 3-[2-(1-adamantylcarboxamido)phenyl]propionate, m.p. 106°–108°C.

c. A mixture of 7.8 g of methyl 3-[2-(1-adamantylcarboxamido)phenyl]propionate and 300 ml of 0.1N sodium hydroxide is heated at reflux until a homogeneous solution is obtained. The solution is clarified, filtered, cooled, and rendered acid with 6N hydrochloric acid to pH 1 yield the desired product in form of a white precipitate. The solid is collected by filtration and is recrystallized from aqueous ethanol as colorless plates, m.p. 192°–193°C.

EXAMPLE 18

| Ingredient | Quantity/capsule |
| --- | --- |
| 2-(1-Adamantylcarboxamido)-phenylacetic acid | 100 mg |
| Corn starch, U.S.P. | 200 mg |

The foregoing ingredients are mixed and introduced onto a two-piece No. 1 hard gelatin capsule.

EXAMPLE 19

| Ingredient | Quantity/tablet |
| --- | --- |
| Methyl 2-(1-adamantylcarboxamido)phenylacetate | 50 mg |
| Corn starch, U.S.P. | 130 mg |
| Lactose | 160 mg |
| Cab-O-Sil M-5 | 4 mg |
| Gelatin U.S.P. | 5 mg |
| Magnesium stearate U.S.P. | 1 mg |

The foregoing ingredients are thoroughly mixed and pressed into tablets suitable for oral administration of 50 g of active ingredient. The tablets may be scored to permit administration of fractional doses.

EXAMPLE 20

| Ingredient | Quantity/tablet |
| --- | --- |
| 2-(1-Adamantylcarboxamido)-phenylacetic acid | 100 mg |
| Lactose | 80 mg |
| Corn starch | 70 mg |
| Soluble starch | 15 mg |
| Magnesium stearate | 5 mg |

The first three ingredients are thoroughly mixed and granulated with a solution of the soluble starch. This granulate is dried, mixed with the magnesium stearate and pressed into tablet cores which are coated as with sugar.

EXAMPLE 21

| Ingredients | Quantity/tablet |
| --- | --- |
| 2-(1-adamantylcarboxamido)-phenylacetic acid | 125.00 mg |
| Polyvinylpyrrolidone (Type C) | 3.75 mg |
| Sodium carboxymethyl-starch | 7.50 mg |
| Magnesium stearate U.S.P. | 1.25 mg |
| Anhydrous ethanol | q.s. |

The first three ingredients are thoroughly mixed, wetted with the ethanol and granulated. The dried granulate is mixed with the magnesium stearate and compressed into round, biconvex tablets, about 4 mm thick and 7 mm in diameter.

EXAMPLE 22

| Ingredients | Quantity/dosage unit |
| --- | --- |
| 2-(1-adamantylcarboxamido)-phenylacetic acid | 400 mg |
| Sodium carbonate, anhydrous | 140 mg |
| Sodium saccharin | 120 mg |
| Freeze-dried coffee | 200 mg |
| Distilled water | 40 ml |

The powders are dry-mixed until uniform. For oral administration each dose is dissolved in 40 ml of water.

I claim:

1. An antiallergic pharmaceutical composition comprising an antiallergically effective amount of a compound of the formula

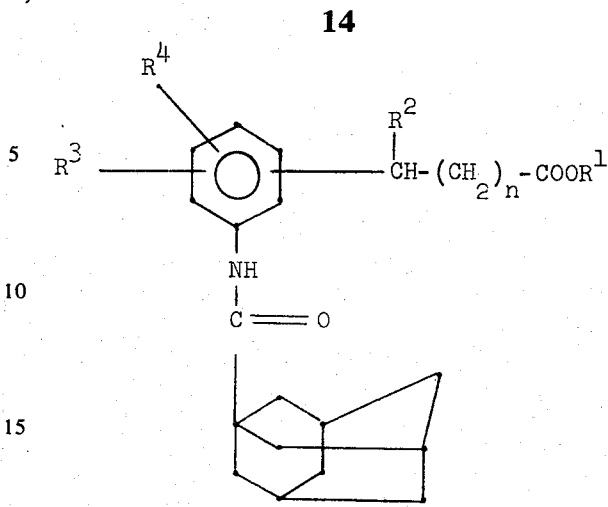

wherein $R^1$ is hydrogen or lower alkyl, $R^2$ is hydrogen or lower alkyl, $R^3$ and $R^4$ are hydrogen, fluorine, chlorine, bromine, lower alkyl, lower alkoxy or trifluoromethyl, and $n$ is 0 or 1, or an alkali metal or ammonium salt thereof, together with a pharmaceutical excipient.

2. A composition as claimed in claim 1, in which compound $R^1$, $R^2$ and $R^4$ are hydrogen, $R^3$ is hydrogen, fluorine, chlorine, bromine, lower alkyl, lower alkoxy or trifluoromethyl, $n$ is zero and the alkanoic acid group is in 2-position of the phenyl ring, or $R^1$ is an alkali metal or ammonium.

3. A composition as claimed in claim 1, wherein said compound is the 2-(1-adamantylcarboxamido)-phenylacetic acid.

4. A composition as claimed in claim 1, wherein said compound is the 2-(1-adamantylcarboxamido)-4-methylphenylacetic acid.

5. A composition as claimed in claim 1, wherein said compound is the 2-(1-adamantylcarboxamido)-4-trifluoromethylphenylacetic acid.

6. A composition as claimed in claim 1, wherein said compound is the 2-(1-adamantylcarboxamido)-5-fluorophenylacetic acis.

7. A composition as claimed in claim 1, wherein said compound is the 2-(1-adamantylcarboxamido)-5-methoxyphenylacetic acid.

8. A composition as claimed in claim 1, wherein an enterally acceptable excipient is used.

9. A method for treating a mammal suffering from inflammatory disorders, comprising administering to said mammal a therapeutically effective amount of a composition as claimed in claim 1.

10. A method for treating a mammal suffering from allergies, comprising administering to said mammal a therapeutically effective amount of a composition as claimed in claim 1.

* * * * *